UNITED STATES PATENT OFFICE.

JOHN B. KNOEBEL, OF SHOAL CREEK, ILLINOIS.

IMPROVED MEDICAL PREPARATION.

Specification forming part of Letters Patent No. 43,118, dated June 14, 1864.

*To all whom it may concern:*

Be it known that I, JOHN B. KNOEBEL, M. D., of Shoal Creek, in the county of Clinton and State of Illinois, have invented a new and Improved Medical Preparation; and I do hereby declare that the following is a full, clear, and exact description thereof, which will enable those skilled in the art to make and use the same.

This invention is based on the discovery that an extract prepared from the juice and seeds of sprouting cucumbers, and also the seeds of watermelons, either alone or mixed with elaterium, tinctura scillæ, tinctura colchici, form a desirable and effective antidote against "dropsy" and other diseases of a similar nature.

The manner in which I prepare the ingredients and mix them together is as follows: The juice and seeds of sprouting cucumbers or the seeds of watermelons are first mashed and boiled down to the consistency of an extract, and afterward pulverized; or, if preferred, said substances may be prepared as a tincture. The extract or tincture thus obtained I term "hydropin," and I mix this hydropin with the above specified ingredients in about the following proportion: hydropin, gr. x; elaterium, gr. vi; solve in spirit nitric œth. $\frac{3}{5}$ i; adde tr. scillac, tr. colchici au. 3 i; M. D. S.; four times daily, twenty drops.

The hydropin alone, independent of the other ingredients, is a very effective antidote for dropsy or other diseases of a similar nature; but when mixed with the other ingredients, as herein stated, a preparation is obtained which has proved to be remarkably effective in such cases which resisted all other remedies, and previous to the use of my preparation had been considered entirely hopeless.

What I claim, and desire to secure by Letters Patent, is—

1. The use of an antidote for dropsy and allied diseases, of the preparation which I term "hydropin," made substantially in the manner herein shown and described.

2. The within-described composition of the ingredients above specified, and mixed together in the manner and about in the proportion set forth.

JOHN B. KNOEBEL.

Witnesses:
L. MEISSNER,
T. KOLKER.